Patented Nov. 28, 1950

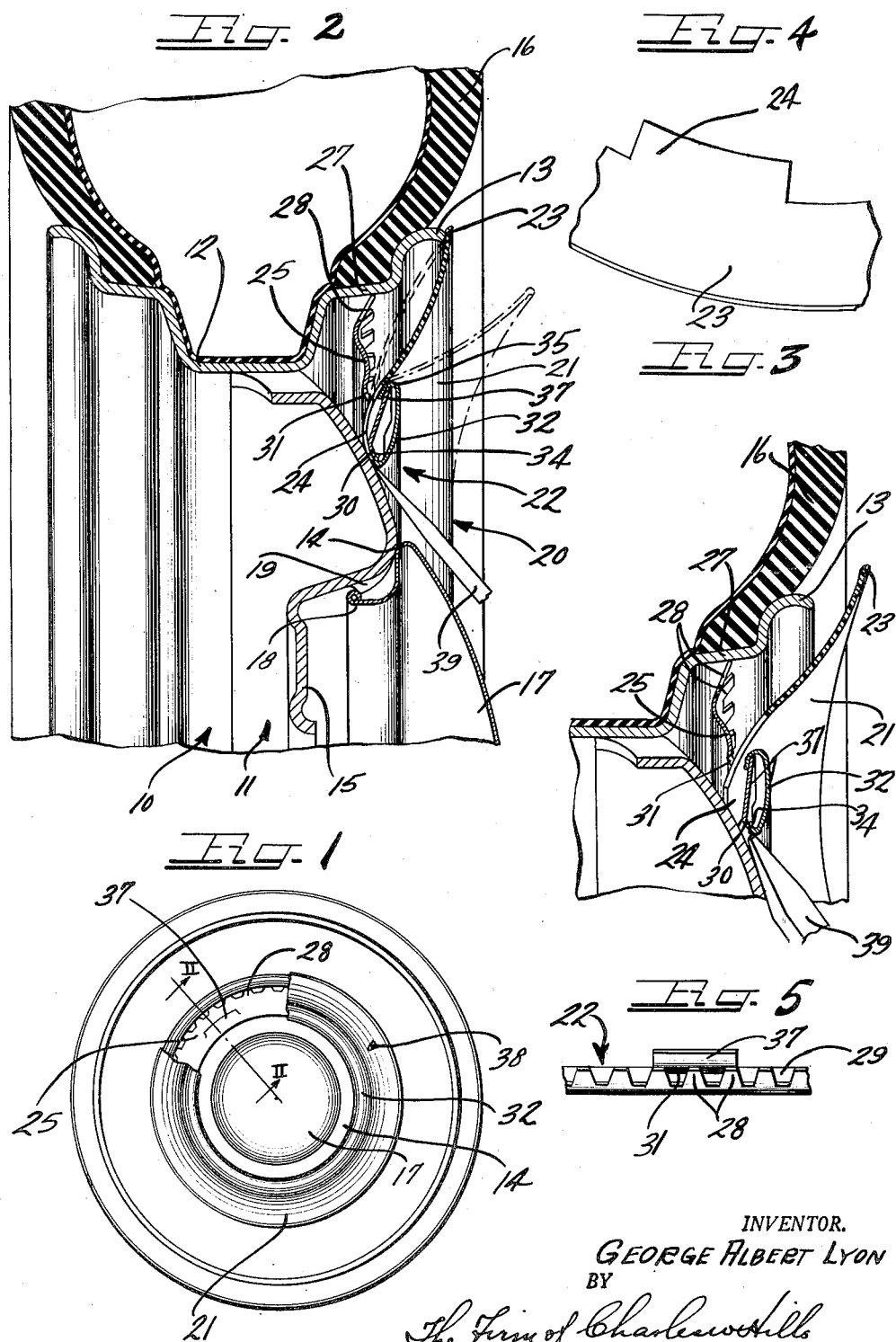

2,531,449

UNITED STATES PATENT OFFICE 2,531,449

WHEEL COVER

George Albert Lyon, Allenhurst, N. J.

Application November 18, 1946, Serial No. 710,454

11 Claims. (Cl. 301—37)

This invention relates to an improved wheel structure and is directed more particularly to a novel cover assembly therefor.

Another object of the invention is to provide a novel cover for a wheel having a multi-flanged tire rim and load sustaining body part wherein the cover ornamentally conceals the tire rim and is retained in engagement with the wheel body.

Another object of the invention is to provide a cover assembly for a wheel having a multi-flanged tire rim and a load sustaining body and wherein the cover assembly includes a tire-rim-concealing cover member and novel retaining means for securing the cover member against the wheel body.

A further object of the invention is to provide a cover assembly for a wheel having a multi-flanged tire rim and a body part wherein a resilient plastic trim ring is separably retained in place to conceal the tire rim and engage the wheel body.

Yet another object of the invention is to provide a cover assembly of the character described wherein a cover member is detachably held in place on the wheel by retaining means which need not be removed from the wheel when the cover member is removed or replaced.

In accordance with the general features of the invention, there is provided for a wheel having a multi-flanged tire rim and a load sustaining body part, a cover assembly including a resiliently flexible trim ring member and a retaining member for securing the trim ring member in concealing relation to the outer side of this tire rim, the trim ring member and the retaining member having slotted and fingered interengagement to render them separable for removing and replacing the trim ring without the necessity for removing the retaining member.

In further accord with the features of the invention, a cover assembly is provided for a wheel having a multi-flanged tire rim and a load sustaining body part, the assembly comprising a resiliently flexible trim ring member having radially inwardly extending tongues at its inner margin, and a retaining ring structure including a resiliently biased portion engageable with said tongues for clamping the same against the wheel body with the trim ring disposed in concealing relation to the tire rim and part of the retaining ring.

Also in accordance with the general features of the invention, there is provided a cover assembly for a wheel including a multi-flanged tire rim and a load sustaining body part, wherein a trim ring member is adapted to be disposed in concealing relation to the outer side of the tire rim and a retaining ring member is adapted to be disposed in more or less permanent engagement with the tire rim and bear against the radially inner margin of the trim ring for holding it against the wheel body, the trim ring and the retaining member being disposed in cross-cross interengagement whereby inner marginal portions of the trim ring extend through clearance openings in the retaining member and inner marginal portions of the retaining member extend through clearances in the inner marginal portion of the trim ring and the inner marginal construction of the retaining member is such as to conceal the inner marginal portion of the trim ring.

An additional feature of the invention resides in the novel construction and inter-relationship of the trim ring and the retaining member, whereby the retaining member is adapted to be more or less permanently attached to the wheel and the trim ring member is adapted to be removed or replaced by springing the retaining member out of clamping engagement to the inner marginal portion of the trim ring member, but in the fully assembled relationship affords a strong, retaining, clamping engagement with the inner marginal portion of the trim ring member to hold it against unintentional displacement.

Other objects, features and advantages of the present invention will become apparent from the following description and the accompanying drawings in which:

Figure 1 is a side elevational view of a wheel structure embodying the features of the present invention and showing the cover partially broken away to reveal certain features of the inner structure thereof;

Figure 2 is a radial sectional view, on an enlarged scale, taken substantially along the line II—II of Figure 1;

Figure 3 is a fragmentary, radial sectional view taken in substantially the same plane as Figure 2 but showing the trim ring portion of the cover assembly in process of being removed or replaced after the cover assembly has been mounted upon the wheel;

Figure 4 is a fragmentary plan view of a portion of the trim ring member; and

Figure 5 is a fragmentary side elevational view of the retaining member of the wheel assembly.

As shown on the drawings:

The present invention is adapted to be embodied in or in association with a vehicle wheel such as may be used on an automobile and including a multi-flanged drop-center type of tire rim 10 and a load sustaining body portion 11.

The tire rim has a base flange 12 to which the body 11 is secured and is formed with the usual side flanges including a radially outwardly extending terminal flange 13.

The wheel body 11 is formed with the usual generally axially outwardly extending reinforcing nose bulge 14, and has a radially inner bolt-on flange 15 which is adapted to be secured to a part of an axle as by means of cap screws or bolts (not shown). The bulge 14 is adapted to serve as a seat for a hub cap 17 which is formed with an axially inwardly extending attachment flange 18 adapted to engage with retaining means such as integral, radially inwardly extending bumps 19 on the nose bulge 14.

According to the present invention, the outer side of the tire rim 13 and the juncture thereof with the wheel body 11 are adapted to be ornamentally concealed by a cover assembly 20 comprising an annular trim ring member 21 and retaining means in the form of an annular structure 22 engageable with the inner marginal portion of the trim ring and equipped, as will be presently described, for engagement with the wheel for holding the cover in place.

The trim ring member 21 is preferably formed from a suitable resiliently deflectable but form-sustaining material which may be substantially resiliently deflected locally without permanent deformation but will at all times, within reasonable limits, snap back to its original shape when released from deforming pressure or pull. Suitable material for this purpose comprises a synthetic plastic such as ethyl cellulose, cellulose acetate or vinyl resins. Where the material is colored white or eggshell and the trim ring is, as shown, of substantially concavo-convex form and of a width to extend on a curve substantially simulating the curve of the sidewall of the tire 16, the general appearance afforded by the trim ring is that of a white wall, radially inward continuation of the sidewall of the tire. This presents an illusion of a massive tire extending substantially to the relatively small wheel body.

At its outer margin the trim ring 21 may be formed with a reinforcing flange 23 which may be slightly bowed axially inwardly so as to facilitate centering the trim ring on the tire rim marginal flange 13.

At its inner margin the trim ring 21 is adapted to engage with the radially outer side of the nose portion 14 of the wheel body and for this purpose may be slightly reversely curved as compared with the main body of the trim ring to facilitate seating against the wheel body.

In order to facilitate interengagement of the trim ring with the retaining structure 22, the radially inner margin of the trim ring is preferably formed into a plurality of generally radially inwardly extending tongues 24 which are disposed in circumferentially equally spaced relation and may be in any suitable number, five having been found a desirable number.

The retaining structure 22 is preferably formed as an ornamentally beaded annular member adapted to be more or less permanently secured in engagement with the tire rim 10 and serving to clamp the trim ring finger 24 removably to the wheel body. To this end the retaining structure 22 comprises an annular relatively stiff but inherently resilient ring body 25 of a width to bridge the gap between an intermediate flange 27 of the tire rim and an intermediate, annular point on the radially outer side of the nose bulge 14 of the wheel body.

Along its radially outer margin, the retaining ring member 25 is formed with a circumferential series of equally spaced, retaining fingers 28 extending in generally radially outwardly and axially outwardly oblique direction. The fingers 28 are adapted to enter into substantially biting, wedging engagement with the radially inner face of the intermediate tire rim flange 27 when the retaining ring 25 is pressed axially inwardly to force the retaining fingers 28 to flex from an initial diameter slightly greater than the inside diameter of the tire rim flange 27. As a result, once the retaining ring member 25 has been pushed axially inwardly into assembly with the tire rim, it is substantially permanently held in place by the fingers 28 and any outward force on the ring 25 merely tends to cause the fingers 28 to enter into more thorough biting engagement with the rim flange 27. To facilitate the flexure of the fingers 28, while at the same time to reinforce the body of the retaining ring 25, it is preferably formed with a substantially ogee curvate cross-section.

Adjacent its inner margin, the retaining ring member 25 is formed with a generally radially and axially outwardly extending intermediate flange portion 29 while the radially inner margin of the ring extends from said flange portion generally radially and axially inwardly and terminates in an annular generally radially inwardly and axially outwardly extending bearing flange 30. This bearing flange serves to delimit by engagement with the nose portion 14 of the wheel body the axially inward position to which the retaining ring 25 is adapted to be pushed when it is being mounted upon the wheel.

At spaced intervals corresponding to the spacing of the inner marginal trim ring fingers 24, the intermediate flange 29 of the retaining ring is formed with circumferentially extending openings 31 through which the fingers 24 are adapted to extend into clamped relation between the bearing flange 30 and the wheel body.

In order to afford an ornamental cover for the trim ring fingers 24 and the clamping portion of the retaining ring 25 which engages the fingers, said clamping portion is equipped with an ornamental bead 32 which may be of pleasing outwardly curved, bowed cross section with the opposite edges turned under for reinforcement and to afford a finished appearance.

Attachment of the bead 32 to the retaining ring 25 may be effected by engaging the hook shaped outer reinforcing flange 35 of the bead over generally radially outwardly extending retaining flanges 37 which are integrally struck out of the intermediate flange 29 of the retaining ring in the formation of the respective trim ring tongue-passage openings 31.

The inner marginal flange 34 of the trim ring may, as shown, substantially engage the inner edge of the bearing flange 30 and supplement the bearing action thereof, and in any event acts as a stiffener or reinforcement for the bearing flange tending to improve the clamping action thereof against the trim ring flanges 24.

The width of the bead 32 is somewhat greater than the length of the trim ring flanges 24 so as to afford complete concealment therefor. The bead 32 may be formed from a polished material such as stainless steel.

In the initial assembly of the cover 20 with the wheel, the trim ring 21 may be preliminarily assembled with the retaining ring 25 by inserting the inner marginal flanges 24 of the trim ring through the openings 31 in the retaining ring and then pushing the cover assembly axially inwardly by pressing against the ornamental bead 32 until the retaining fingers 28 have entered into full engagement with the intermediate tire rim flange 27 and the bearing flange 30 of the retaining ring has clamped the flanges 24 of the trim ring against the wheel body. In this position the resiliently flexible trim ring 21 may be flexed open as shown in dot-dash outline in Figure 2 in which condition the rounded outer marginal flange 35 of the ornamental bead affords a backing which saves the inner marginal portion of the trim ring against undue flexure strain which might induce breaking. On the other hand, the trim ring is adapted to be readily flexed inwardly as shown in dash outline for such purposes as to afford clearance for complete access to a valve stem which is adapted to project through an aperture 38 provided therefor at an appropriate point in the trim ring.

In the fully assembled condition of the cover 20 with the wheel, the inner margin of the trim ring and in particular the flanges 24 thereof are adapted to be placed under axially inward tension conditioned to hold the outer margin of the trim ring, that is the outer marginal flange 23 thereof, in snug engagement with the edge of the terminal flange 13 of the tire rim.

If for any reason it is desired to remove or replace the trim ring 21, this may be conveniently accomplished by flexing the clamping margin 30 of the retaining ring 25 away from the wheel body to release the trim ring flanges 24 so that the latter can be withdrawn from the retained engagement. For this purpose, a pry-off tool 39 such as a screwdriver may be inserted under the inner marginal flange 34 of the bead 32 and the bead can thereby be flexed away from the wheel body substantially as shown in Figure 3, and flex the clamping flange 31 out of the clamping position. Thereupon, by simple flexure of the resilient trim ring 21 as shown, the retaining tongues 24 thereof can be successively withdrawn through the clearance openings 31 until the trim ring is removed.

Replacement of the trim ring is adapted to be effected by reversal of this process, wherein the inner marginal retaining tongues 24 of the trim ring are successively inserted through the respective clearance opening 31. When all of the fingers 24 have been inserted through the respective openings 31 and the trim ring has been centered, the clamping flange 30 of the retaining ring member thoroughly clamps the fingers 24 against shifting of the trim ring out of concentricity while the side edges of the fingers engaging with the adjacent edges of the openings 31 hold the trim ring against relative rotation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a cover structure for a wheel including a multi-flanged tire rim and a body part, a trim ring member for disposition in concealing relation to the outer side of the tire rim and having a plurality of radially inward tongues at its inner margin, and a retaining member having means thereon for attachment thereof to the tire rim and having a bearing portion adapted to engage in bearing relation to said tongues to clamp the same against the wheel body, said retaining member having openings therein for passage of said tongues to the axially inner side of said bearing portion.

2. In a cover structure for a wheel including a multi-flanged tire rim and a body part, a trim ring member for disposition in concealing relation to the outer side of the tire rim and having a plurality of radially inward tongues at its inner margin, and a retaining member having means thereon for attachment thereof to the tire rim and having a bearing portion adapted to engage in bearing relation to said tongues to clamp the same against the wheel body, said retaining member having openings therein for passage of said tongues to the axially inner side of said bearing portion, said means for engaging the tire rim comprising retaining fingers bitingly engageable with an intermediate flange of the tire rim for substantially permanently holding the retaining member thereon.

3. In a cover structure for a wheel including a multi-flanged tire rim and a body part, a trim ring member for disposition in concealing relation to the outer side of the tire rim and having a plurality of radially inward tongues at its inner margin, and a retaining member having means thereon for attachment thereof to the tire rim and having a bearing portion adapted to engage in bearing relation to said tongues to clamp the same against the wheel body, said retaining member having openings therein for passage of said tongues to the axially inner side of said bearing portion, said means for engaging the tire rim comprising retaining fingers bitingly engageable with an intermediate flange of the tire rim for substantially permanently holding the retaining member thereon, said retaining member being flexible away from the clamping engagement with respect to the body member for releasing said retaining fingers of the trim member.

4. In a cover construction for a wheel including a multi-flanged tire rim and body part, a resilient plastic trim ring member for concealing the tire rim and having the inner marginal portion thereof formed with generally radially inwardly extending tongues adapted to bear against the wheel body, and a retaining ring member having openings therethrough through which said tongues extend and including a bearing part for clamping said tongues against the wheel body and a part for retaining engagement with one of said wheel parts.

5. In a cover construction for a wheel including a multi-flanged tire rim and body part, a resilient, plastic trim ring member for concealing the tire rim and having the inner marginal portion thereof formed with generally radially inwardly extending tongues adapted to bear against the wheel body, a retaining ring member having openings therethrough through which said tongues extend and including a bearing part for clamping said tongues against the wheel body and a part for retaining engagement with one of said wheel parts, said retaining member having generally radially outwardly extending retaining flanges thereon at the axially outer sides of said openings, and a bead portion secured to the retaining member by said retaining flanges in concealing relation to said bearing portion and said trim ring tongues.

6. In a cover structure for a wheel including a multi-flanged tire rim and a load supporting body, an outer circular cover member adapted to be disposed in concealing relation to the tire rim and extending generally radially inwardly to the body of the wheel, and a second circular cover member adapted to be disposed at the body and extending generally radially outwardly to the tire rim, said cover members being interengaged with the inner cover member retaining the outer cover member in place, the inner of said cover members having openings therethrough and the outer of said cover members having tongues extending through said openings and disposed to be concealed by and clamped in place against the wheel body by the inner cover member.

7. In a cover structure for a wheel including a multi-flanged tire rim and a load supporting body, an outer circular cover member adapted to be disposed in concealing relation to the tire rim and extending generally radially inwardly to the body of the wheel, and a second circular cover member adapted to be disposed at the body and extending generally radially outwardly to the tire rim, one of cover members having openings therethrough and the other of said cover members having fingers extending through said openings and behind said one cover member, the inner cover member retaining the outer cover member in place, the inner of said cover members having an ornamental bead concealing the juncture of the cover members.

8. In a cover structure for a wheel of the kind including a tire rim and a body part, a pair of circular cover members one of which is adapted to be attached to the wheel and has a series of openings therein with a portion of such cover member adjacent to said openings engageable with one of the wheel parts, the other of said cover members having fingers thereon arranged to extend through said openings and behind said portion to be clamped thereby against said one wheel part, said cover members being separable by relieving the clamping engagement of said fingers against the wheel part and withdrawal of the fingers from said openings.

9. In combination in a cover structure for disposition at the outer side of a vehicle wheel, a pair of circular cover members one of which has openings therethrough and the other one of which has fingers thereon engageable in assembly through said openings, said openings being defined at the outer side of said one cover member by tongue-like flange portions, and an ornamental bead member in engagement with said flange portions and retained thereby in ornamental concealing relation to said openings and said flange portions and thereby of the juncture of said cover members.

10. A cover structure as defined in claim 9 wherein the flange portions are integrally struck out from said one cover member to provide the openings therein and extend in generally overlying relation to the respective openings.

11. In a wheel structure including tire rim and wheel body parts, a cover for the outer side of the wheel including a pair of circular cover members, each of the cover members having a marginal portion disposed behind the other, the marginal portion of one of the cover members comprising a plurality of annularly spaced fingers, the other of the cover members having a plurality of openings therethrough through which said fingers extend, said other cover member including means engaging with one of the wheel parts to retain the cover in place and acting to clamp said fingers against the other of said wheel parts.

GEORGE ALBERT LYON.

REFERENCES CITED

The following references are of record in the file of this patent:

UNITED STATES PATENTS

| Number | Name | Date |
| --- | --- | --- |
| 2,368,240 | Lyon | Jan. 30, 1945 |